United States Patent
Ding et al.

(10) Patent No.: US 10,936,053 B2
(45) Date of Patent: Mar. 2, 2021

(54) INTERACTION SYSTEM OF THREE-DIMENSIONAL SPACE AND METHOD FOR OPERATING SAME

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Chunwei Wu, Beijing (CN); Yingming Liu, Beijing (CN); Pengpeng Wang, Beijing (CN); Chihjen Cheng, Beijing (CN); Yanling Han, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 369 days.

(21) Appl. No.: 15/776,960

(22) PCT Filed: Sep. 29, 2017

(86) PCT No.: PCT/CN2017/104165
§ 371 (c)(1),
(2) Date: May 17, 2018

(87) PCT Pub. No.: WO2018/176773
PCT Pub. Date: Oct. 4, 2018

(65) Prior Publication Data
US 2020/0272228 A1    Aug. 27, 2020

(30) Foreign Application Priority Data
Mar. 29, 2017 (CN) .......................... 201710197342.0

(51) Int. Cl.
*G06F 3/01* (2006.01)
*G06T 7/70* (2017.01)
(Continued)

(52) U.S. Cl.
CPC .......... *G06F 3/013* (2013.01); *G06F 3/04815* (2013.01); *G06F 3/04845* (2013.01);
(Continued)

(58) Field of Classification Search
CPC ..................... G01S 13/42; G01S 15/42; G06T 2207/10048; G06T 2207/30201; G06F 3/017
See application file for complete search history.

(56) References Cited

U.S. PATENT DOCUMENTS

| 8,836,768 B1 * | 9/2014 | Rafii ...................... G06F 3/0304 348/47 |
| 2012/0327116 A1 * | 12/2012 | Liu ..................... G02B 27/0093 345/633 |

(Continued)

FOREIGN PATENT DOCUMENTS

| CN | 1904806 A | 1/2007 |
| CN | 103793060 A | 5/2014 |

(Continued)

OTHER PUBLICATIONS

International Search Report and Written Opinion for PCT/CN2017/104165 dated Jan. 4, 2018.
(Continued)

*Primary Examiner* — Christopher E Leiby
(74) *Attorney, Agent, or Firm* — Dinsmore & Shohl LLP

(57) ABSTRACT

The present disclosure provides an interaction system of three-dimensional space and a method for operating the same, comprising: determining visual field space according to an eye position of an operator and an angle at which the eye is watching, and determining absolute interaction space and relative interaction space according to respective joint positions of the operator and the visual field space, thereby achieving dividing of areas of the space; determining an
(Continued)

operation that matches a current action and needs to be performed by the operator on a selected virtual object according to a relationship among the current action of the operator, the virtual object viewed by the operator and the absolute interaction space, such that when the operator makes the corresponding action, the operation matching the action of the operator is performed on the virtual object; outputting the generated corresponding three-dimensional image display signal to a three-dimensional image display device to complete somatosensory interaction of the three-dimensional space.

18 Claims, 9 Drawing Sheets

(51) Int. Cl.
| | | |
|---|---|---|
| *G06F 3/0481* | (2013.01) | |
| *G06F 3/0484* | (2013.01) | |
| *G06T 15/20* | (2011.01) | |
| *G01S 13/42* | (2006.01) | |
| *G01S 15/42* | (2006.01) | |

(52) U.S. Cl.
CPC ................ *G06T 7/70* (2017.01); *G06T 15/20* (2013.01); *G01S 13/42* (2013.01); *G01S 15/42* (2013.01); *G06T 2207/10048* (2013.01); *G06T 2207/30201* (2013.01)

(56) References Cited

U.S. PATENT DOCUMENTS

| | | | | |
|---|---|---|---|---|
| 2015/0002394 | A1* | 1/2015 | Cho | ............... G01B 27/0093 |
| | | | | 345/156 |
| 2016/0011669 | A1* | 1/2016 | Fink | ..................... G06F 3/012 |
| | | | | 345/156 |
| 2018/0120944 | A1* | 5/2018 | Wang | .................... G06F 3/013 |

FOREIGN PATENT DOCUMENTS

| | | |
|---|---|---|
| CN | 106502427 A | 3/2017 |
| CN | 106980377 A | 7/2017 |

OTHER PUBLICATIONS

First Office Action for CN Application No. 201710197342.0, dated Apr. 4, 2018.

* cited by examiner

INTERACTION SYSTEM OF THREE-DIMENSIONAL SPACE AND METHOD FOR OPERATING SAME

CROSS-REFERENCE TO RELATED APPLICATIONS

The present application is a U.S. National Stage under 35 U.S.C. § 371 of International Application No. PCT/CN2017/104165, filed on Sep. 29, 2017, which claims priority to Chinese Patent Application No. 201710197342.0, filed on Mar. 29, 2017, the disclosure of each of which is incorporated herein in its entirety by reference as a part of the present disclosure.

TECHNICAL FIELD

The present disclosure relates to an interaction system of three-dimensional space and a method for operating the same.

BACKGROUND

At present, in the field of display, the three-dimensional display technology creates virtual environments for the people and enables a viewer to have an immersive sensing of various scenes in the picture. In addition, the somatosensory interaction technology enables a user to control a system by his/her body so that the user needs only to make actions in front of a display which captures the user's actions and causes a displayed picture to generate a display image matching the user's actions.

SUMMARY

The examples of the present disclosure provide an interaction system of three-dimensional space, comprising: an eye positioning device, a space positioning device, and a master control device, wherein:

said eye positioning device is used for determining an eye position of an operator and an angle at which the eye is watching and for outputting the eye position and the angle to the master control device;

said space positioning device is used for determining respective joint positions of the operator and for outputting the respective joint positions to said master control device;

said master control device includes: a visual field space processor, an interaction space processor, an operating action processor, an interaction matching processor and an image processor;

said visual field space processor being electrically connected to said eye positioning device, for determining visual field space according to the eye position of the operator and the angle at which the eye is watching;

said interaction space processor being electrically connected to said space positioning device and said visual field space processor, respectively, for determining interaction space according to the respective joint positions of the operator and using an area in said interaction space overlapping with said visual field space as absolute interaction space and the other areas in said interaction space as relative interaction space;

said operating action processor being electrically connected to said space positioning device, for determining a current action of the operator according to changes of the respective joint positions of the operator;

said interaction matching processor being electrically connected to said visual field space processor, said interaction space processor and said operating action processor, respectively, for determining an operation that matches the current action and needs to be performed on a selected virtual object by the operator according to a relationship among the current action of the operator, the virtual object viewed by the operator and the absolute interaction space;

said image processor being electrically connected to said interaction matching processor and said visual field space processor, respectively, for generating a corresponding three-dimensional image display signal according to the visual field space and the operation that matches the current action and needs to be performed on the selected virtual object by the operator and outputting the corresponding three-dimensional image display signal to an electrically connected three-dimensional image display device.

In one possible embodiment, in said interaction system provided by the examples of the present disclosure, said operating action processor is further used for determining a current touch control action of the operator according to a change of the joint position of a touch control part of the operator; and determining a current body action of the operator according to a change of the joint position of a non-touch control part of the operator.

In one possible embodiment, in said interaction system provided by the examples of the present disclosure, said interaction matching processor is further used for determining that the operator performs an operation of moving the virtual object positioned in said visual field space outside the interaction space into said absolute interaction space when it is determined that the current touch control action of the operator is within the relative interaction space.

In one possible embodiment, in said interaction system provided by the examples of the present disclosure, said visual field space processor is further used for determining watching space within said visual field space according to an angle at which the eye of the operator is watching;

said interaction matching processor is further used for determining that the operator performs an operation of moving the virtual object positioned in said watching space outside the interaction space into said absolute interaction space when it is determined that the current touch control action of the operator is within the relative interaction space.

In one possible embodiment, in said interaction system provided by the examples of the present disclosure, said interaction space processor is further used for using an area in the absolute interaction space overlapping with the watching space as refined interaction space;

said interaction matching processor is further used for determining that the operator performs a corresponding operation on the selected virtual object positioned in said absolute interaction space when it is determined that the current touch control action of the operator is within the absolute interaction space.

In one possible embodiment, in said interaction system provided by the examples of the present disclosure, said interaction matching processor is further used for determining that the operator performs a corresponding operation on the selected virtual object positioned in said refined interaction space when it is determined that the current touch control action of the operator is within the absolute interaction space.

In one possible embodiment, in said interaction system provided by the examples of the present disclosure, said image processor is further used for determining a position of a three-dimensional image of said virtual object in said three-dimensional image display device according to a change of a visual angle at which the operator watches the same virtual object when the eye position of the operator changes, and for generating a corresponding three-dimensional image display signal and outputting it to the electrically connected three-dimensional image display device, wherein a positional relationship between the same virtual object and said three-dimensional image display device is relatively fixed.

In one possible embodiment, in said interaction system provided by the examples of the present disclosure, said image processor is further used for determining the position of the three-dimensional image of said virtual object in said three-dimensional image display device according to the following formula:

$$c_1 = a_1 - (x_2 - x_1)\frac{\sqrt{(a_1 - a_2)^2 + (b_1 - b_2)^2}}{d_1}$$

$$d_1 = b_1 - (y_2 - y_1)\frac{\sqrt{(a_1 - a_2)^2 + (b_1 - b_2)^2}}{d_1}$$

$$c_2 = a_2 - (x_2 - x_1)\frac{\sqrt{(a_1 - a_2)^2 + (b_1 - b_2)^2}}{d_1}$$

$$d_2 = b_2 - (y_2 - y_1)\frac{\sqrt{(a_1 - a_2)^2 + (b_1 - b_2)^2}}{d_1}$$

wherein $(x_1, y_1)$ represents a position of a pupillary distance center of the eyes of the operator before a change, $(x_2, y_2)$ represents a position of the pupillary distance center of the eyes of the operator after the change, $(a_1, b_1)$ represents a left-eye image position of said virtual object in said three-dimensional image display device before the eye position of the operator changes, $(a_2, b_2)$ represents a right-eye image position of said virtual object in said three-dimensional image display device before the eye position of the operator changes, $(c_1, d_1)$ represents a left-eye image position of said virtual object in said three-dimensional image display device after the eye position of the operator changes, $(a_2, b_2)$ represents a right-eye image position of said virtual object in said three-dimensional image display device after the eye position of the operator changes, and d1 represents the pupillary distance of the eyes of the operator.

In one possible embodiment, in said interaction system provided by the examples of the present disclosure, said eye positioning device includes: a first IR emitter, a first IR camera, and a first processing chip, wherein:

said first IR emitter is used for emitting a first IR signal to the operator;

said first IR camera is used for acquiring a first IR signal image reflected by the eyes of the operator;

said first processing chip is used for determining an eye position of the operator and an angle at which the eye is watching according to the first IR signal emitted by the first IR emitter and the first IR signal image reflected by the eyes of the operator and acquired by the first IR camera, and for outputting them to said master control device.

In one possible embodiment, in said interaction system provided by the examples of the present disclosure, said space positioning device includes: a second IR emitter, a second IR camera, and a second processing chip, wherein:

said second IR emitter is used for emitting a second IR signal to the operator;

said second IR camera is used for acquiring a second IR signal image reflected by the respective joint positions of the operator;

said second processing chip is used for determining the respective joint positions of the operator according to the second IR signal emitted by the second IR emitter and the second IR signal image reflected by the respective joint positions of the operator and acquired by the second IR camera, and for outputting them to said master control device.

In one possible embodiment, in said interaction system provided by the examples of the present disclosure, said first IR emitter and said second IR emitter are the same IR emitter; and said first IR camera and said second IR camera are the same IR camera.

In one possible embodiment, in said interaction system provided by the examples of the present disclosure, said space positioning device further includes: a radar detector and/or an ultrasonic detector, wherein:

said radar detector is used for detecting, with radar, a radar signal reflected by the joint positions of a touch control part of the operator; and said ultrasonic detector is used for detecting, with ultrasonic waves, an ultrasonic signal reflected by the joint positions of the touch control part of the operator.

On the other hand, the examples of the present disclosure further provide an interaction control device of three-dimensional space, comprising: a visual field space processor, an interaction space processor, an operating action processor, an interaction matching processor and an image processor;

said visual field space processor being electrically connected to an eye positioning device, for determining visual field space according to the eye position of the operator and the angle at which the eye is watching, which are received from said eye positioning device;

said interaction space processor being electrically connected to a space positioning device and said visual field space processor, respectively, for determining interaction space according to the respective joint positions of the operator which are received from said space positioning device and using an area in said interaction space overlapping with said visual field space as absolute interaction space and the other areas in said interaction space as relative interaction space;

said operating action processor being electrically connected to said space positioning device, for determining a current action of the operator according to changes of the respective joint positions of the operator;

said interaction matching processor being electrically connected to said visual field space processor, said interaction space processor and said operating action processor, respectively, for determining an operation that matches the current action and needs to be performed on a selected virtual object by the operator according to a relationship among the current action of the operator, the virtual object viewed by the operator and the absolute interaction space;

said image processor being electrically connected to said interaction matching processor and said visual field space processor, respectively, for generating a corresponding three-dimensional image display signal according to the visual field space and the operation that matches the current action and needs to be performed on the selected virtual object by the operator and outputting the corresponding three-dimensional image display signal to an electrically connected three-dimensional image display device.

For example, the interaction control device of three-dimensional space may be the master control device according to some embodiments of the present disclosure.

On the other hand, the examples of the present disclosure further provide a method for operating the interaction system of three-dimensional space, comprising:

determining, by an eye positioning device, an eye position of an operator and an angle at which the eye is watching and outputting them to a master control device;

determining, by a space positioning device, respective joint positions of the operator and outputting them to said master control device;

determining, by a visual field space processor in said master control device, visual field space according to the eye position of the operator and the angle at which the eye is watching;

determining, by an interaction space processor in said master control device, interaction space according to the respective joint positions of the operator and using an area in said interaction space overlapping with said visual field space as absolute interaction space and the other areas in said interaction space as relative interaction space;

determining, by an operating action processor in said master control device, a current action of the operator according to changes of the respective joint positions of the operator;

determining, by an interaction matching processor in said master control device, an operation that matches the current action and needs to be performed on a virtual object selected by the operator according to a relationship among the current action of the operator, the virtual object viewed by the operator and the absolute interaction space; and generating, by an image processor in said master control device, a corresponding three-dimensional image display signal according to the visual field space and the operation that matches the current action and needs to be performed on the virtual object selected by the operator and outputting the corresponding three-dimensional image display signal to an electrically connected three-dimensional image display device.

DETAILED DESCRIPTION

The embodiments of the interaction system of three-dimensional space provided by the examples of the present disclosure are explained in detail below with reference to the drawings. It is to be noted that the examples as described are just a part instead of all the examples of the present disclosure. All other examples that are obtainable to those skilled in the art based on the examples of the present disclosure without any creative effort are included in the protection scope of the present disclosure.

At present, the somatosensory interaction technology, such as Kinect, is only applicable to television games displayed in two dimensions, while there are few somatosensory interaction technologies based on three-dimensional display. In view of this, it is an urgent technical problem to be solved by those skilled in the art that how to combine the three-dimensional display technology with the somatosensory interaction technology to achieve somatosensory interaction in three-dimensional space and improve the user's interaction experience.

The examples of the present disclosure provide an interaction system of three-dimensional space and a method for operating the same, for solving the existing technical problem that how to combine the three-dimensional display technology with the somatosensory interaction technology to achieve somatosensory interaction in three-dimensional space and improve the user's interaction experience.

The present disclosure has the following beneficial effects:

The examples of the present disclosure provide an interaction system of three-dimensional space and a method for operating the same, wherein the interaction system: determines visual field space according to an eye position of an operator and an angle at which the eye is watching, and determines absolute interaction space and relative interaction space according to respective joint positions of the operator and the visual field space, thereby achieving dividing of areas of the space; determines an operation that matches a current action and needs to be performed by the operator on a selected virtual object according to a relationship among the current action of the operator, the virtual object viewed by the operator and the absolute interaction space, such that when the operator makes the corresponding action, the operation matching the action of the operator is performed on the virtual object; outputs the generated corresponding three-dimensional image display signal to an electrically connected three-dimensional image display device to display the three-dimensional image and complete somatosensory interaction of the three-dimensional space. Thus, the interaction system not only divides the areas of the space but also analyzes the actions made by the operator, such that the operation of the operator interacts with the image and an excellent experience of somatosensory interaction is achieved.

Figure 1:
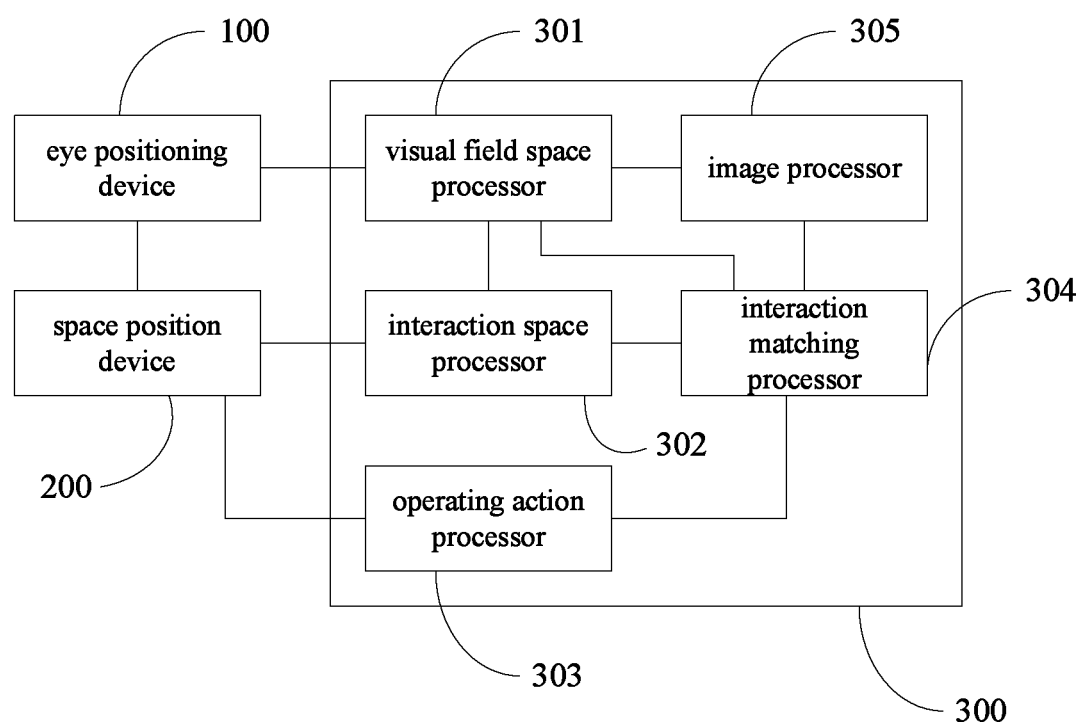
FIG. 1 is a first schematic diagram showing a structure of the interaction system of three-dimensional space provided in the examples of the present disclosure.

The examples of the present disclosure provide an interaction system of three-dimensional space, which, as shown in FIG. 1, comprises: an eye positioning device 100, a space positioning device 200, and a master control device 300, wherein:

said eye positioning device 100 is used for determining an eye position of an operator and an angle at which the eye is watching and for outputting them to said master control device 300;

said space positioning device 200 is used for determining respective joint positions of the operator and for outputting them to said master control device 300;

said master control device 300 includes: a visual field space processor 301, an interaction space processor 302, an operating action processor 303, an interaction matching processor 304 and an image processor 305;

said visual field space processor 301 is electrically connected to said eye positioning device 100, for determining visual field space according to the eye position of the operator and the angle at which the eye is watching;

said interaction space processor 302 is electrically connected to said space positioning device 200 and said visual field space processor 301, respectively, for determining interaction space according to the respective joint positions of the operator and using an area in said interaction space overlapping with said visual field space as absolute interaction space and the other areas in said interaction space as relative interaction space;

said operating action processor 303 is electrically connected to said space positioning device 200, for determining a current action of the operator according to changes of the respective joint positions of the operator;

said interaction matching processor 304 is electrically connected to said visual field space processor 301, said interaction space processor 302 and said operating action processor 303, respectively, for determining an operation that matches the current action and needs to be performed on a selected virtual object by the operator according to a relationship among the current action of the operator, the virtual object viewed by the operator and the absolute interaction space;

said image processor 305 is electrically connected to said interaction matching processor 304 and said visual field space processor 301, respectively, for generating a corresponding three-dimensional image display signal according to the visual field space and the operation that matches the current action and needs to be performed on the selected virtual object by the operator and outputting it to an electrically connected three-dimensional image display device.

In said interaction system of three-dimensional space provided by the examples of the present disclosure, said interaction system implements the division of the areas of the space; when the operator makes a corresponding action, the action made by the operator is analyzed and an operation matching the action made by the operator is performed on the virtual object, such that the operation and the image of the operator interact with each other; a generated corresponding three-dimensional image display signal is outputted to an electrically connected three-dimensional image display device, so that the three-dimensional image is displayed, thereby enabling excellent experience of somatosensory interaction.

Figure 2:
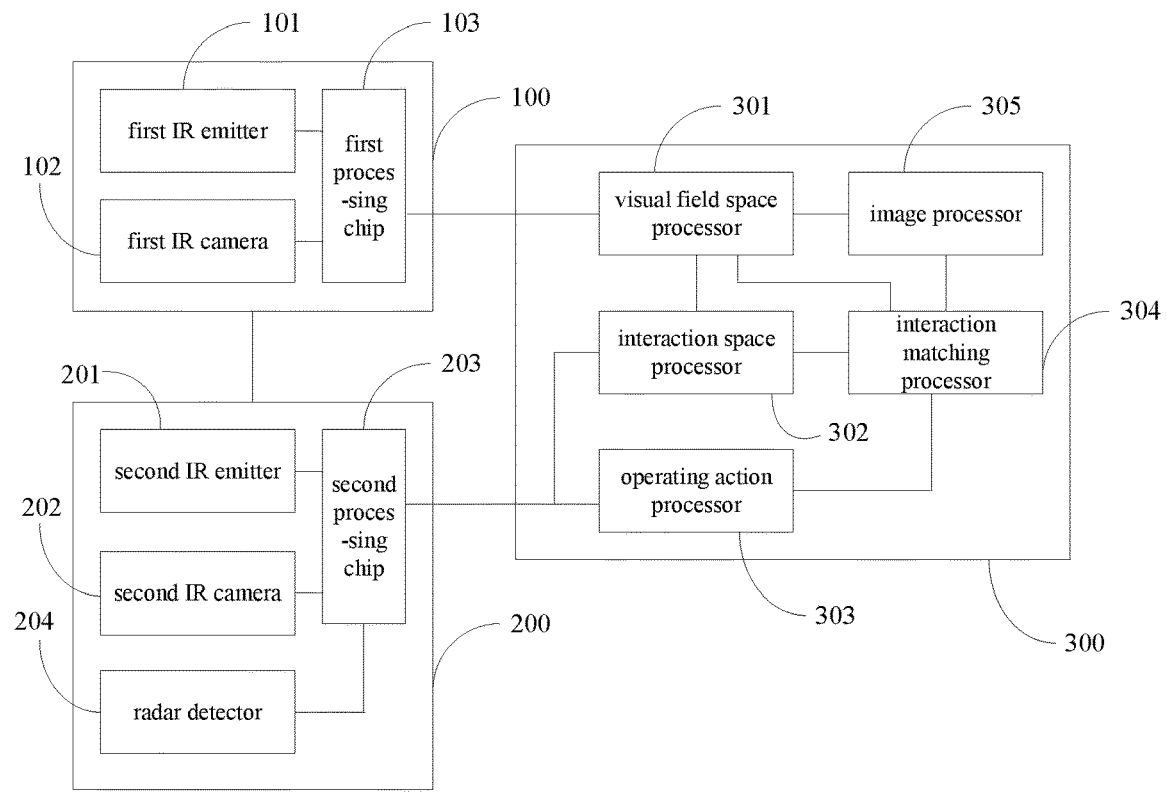
FIG. 2 is a second schematic diagram showing a structure of the interaction system of three-dimensional space provided in the examples of the present disclosure.

In practice, generally the initiative IR imaging technology is employed to position the eye position of the operator and the angle at which the eye is watching. Further, the initiative IR imaging technology generally includes an IR emitter emitting an IR signal, an IR camera acquiring an IR signal image, and a processing chip resolving the emitted IR signal and the acquired IR signal image. Thus, in said interaction system provided by the examples of the present disclosure, as shown in FIG. 2, the eye positioning device 100 may include: for example, a first IR emitter 101, a first IR camera 102, and a first processing chip 103; wherein:

said first IR emitter 101 is used for emitting a first IR signal to the operator;

said first IR camera 102 is used for acquiring a first IR signal image reflected by the eyes of the operator;

said first processing chip 103 is used for determining an eye position of the operator and an angle at which the eye is watching according to the first IR signal emitted by the first IR emitter 101 and the first IR signal image reflected by the eyes of the operator and acquired by the first IR camera 102, and for outputting them to said master control device 300.

Of course, in order to position the eye position of the operator and the angle at which the eye is watching, in addition to said initiative IR imaging technology, other technologies that can achieve said object can be employed, which are not limited here.

For example, the visual field space processor 301 in said master control device 300 may determine the visual field space according to the eye position of the operator and the angle at which the eye is watching as determined by the eye positioning device 100; of course, a position, a shape and a dimension of the three-dimensional image display device and a visual angle of the eye may be used to determine the visual field space. Generally, the visual angle of an eye is 120° at maximum. Accordingly, a corresponding maximum visual range is the maximum visual angle when taking the center of a pupillary distance of the eyes as a vertex. Therefore, depending on the positional relationship between the operator and the three-dimensional image display device, there are the following two cases: firstly, the dimension of the three-dimensional image display device is greater than or equal to the maximum visual range of the eye; secondly, the dimension of the three-dimensional image display device is smaller than the maximum visual range of the eye.

Figure 3A:
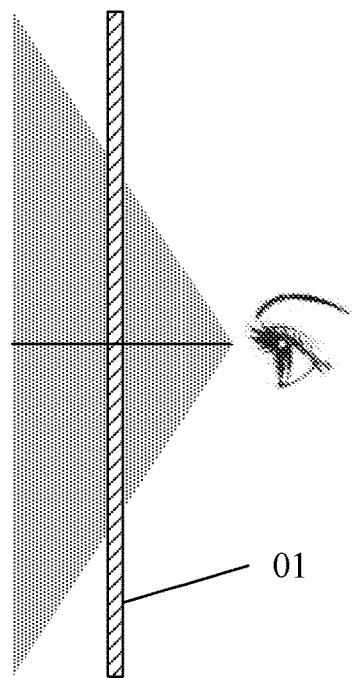
FIGS. 3a and 3b are schematic diagrams showing a relationship between the three-dimensional image display device and a visual range of the eye provided in the examples of the present disclosure.
Figure 3B:
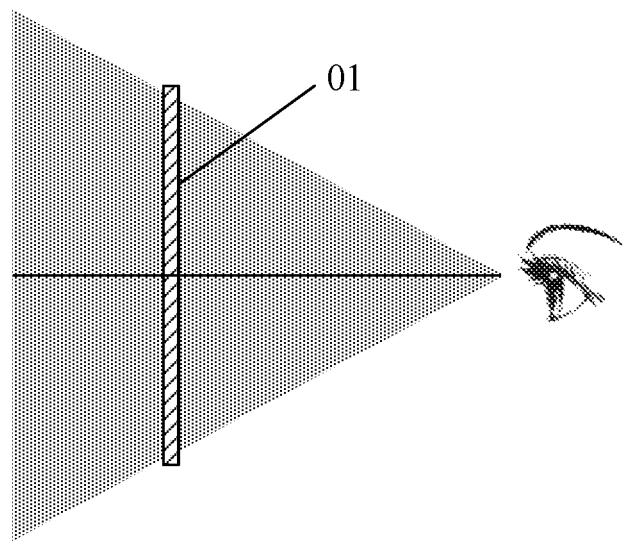

When the dimension of the three-dimensional image display device is greater than or equal to the maximum visual range of the eye, as shown in FIG. 3a in which the dimension of the three-dimensional image display device 01 is greater than the maximum visual range of the eye, the visual field space of the operator (the space filled with black dots) is the maximum visual range, and the solid lines in the horizontal direction represent a depth of focus of the visual field; when the dimension of the three-dimensional display device 01 is smaller than the maximum visual range of the eye, as shown in FIG. 3b, the visual angle of the eye is related to the dimension and the position of the three-dimensional image display device 01, and the solid lines in the horizontal direction represent the depth of focus of the visual field.

Figure 4:
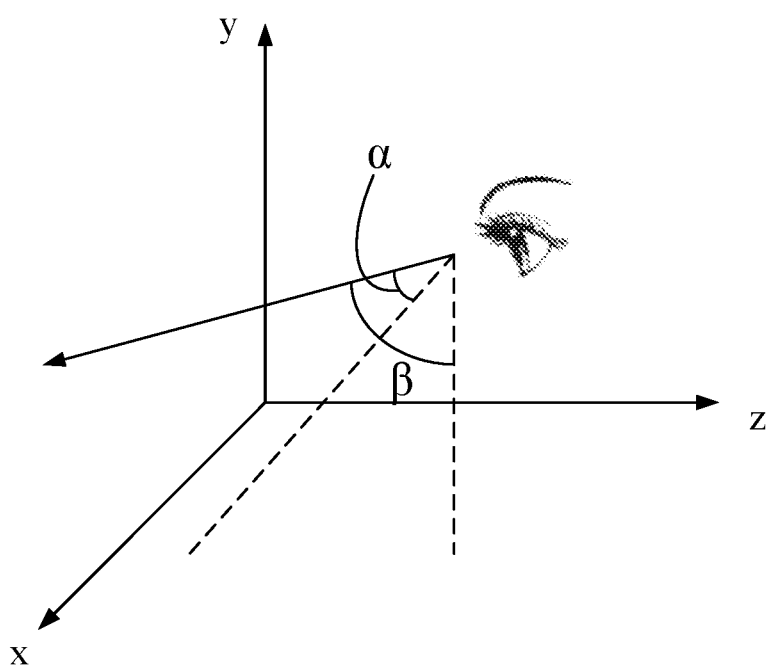
FIG. 4 is a schematic diagram showing a direction in which the eye is watching provided in the examples of the present disclosure.
Figure 5:
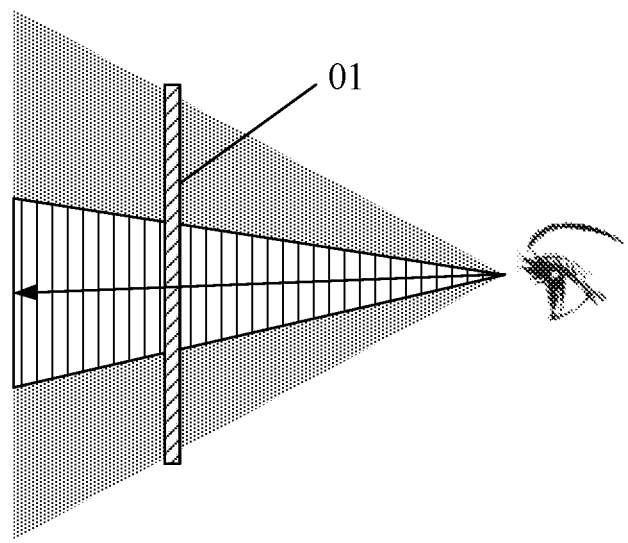
FIG. 5 is a schematic diagram showing a structure of the watching space provided in the examples of the present disclosure.

For example, by using the initiative IR imaging technology, not only the eye position of the operator and the angle at which the eye is watching but also the watching position of the operator can be positioned. Taking FIG. 3b for example, in which the dimension of the three-dimensional image display device 01 is smaller than the maximum visual range of the eye, as shown in FIG. 4, a position coordinate of the eye in the three-dimensional space consisting of an X-axis, a Y-axis and a Z-axis is (x, y, z, α, β), wherein α is an included angle between the watching direction and the x-axis, β is an included angle between the watching direction and the y-axis, and both α and β represent azimuth angles in the watching direction of the eye. Thus, as shown in FIG. 5, according to the watching direction (the arrowed solid line), the visual field space within a vertex angle of 20° (with the watching direction as an axis center, and the center of pupillary distance of the eyes as a vertex) is determined as watching space (the area filled with vertical lines). Within the watching space, the eye of the operator may see clearly any picture within the watching space; and the eye may see pictures outside the watching space but within the visual field space ambiguously. Thus, when it is necessary to perform an operation on a virtual object within the visual field space, an accuracy of the operation may be increased by means of the watching space.

In practice, the IR imaging technology may also be generally employed in the preliminary positioning of the space, wherein the following components are used: an IR emitter that emits an IR signal, an IR camera that acquires an IR signal image, and a processing chip that resolves the IR signal and the IR signal image. Thus, in said interaction system provided by the examples of the present disclosure, as shown in FIG. 2, the space positioning device 200 may include: for example, a second IR emitter 201, a second IR camera 202, and a second processing chip 203, wherein:

said second IR emitter 201 is used for emitting a second IR signal to the operator;

said second IR camera 202 is used for acquiring a second IR signal image reflected by the respective joint positions of the operator;

said second processing chip 203 is used for determining the respective joint positions of the operator according to the second IR signal emitted by the second IR emitter and the second IR signal image reflected by the respective joint positions of the operator and acquired by the second IR camera 202, and for outputting them to said master control device 300.

For example, in both the eye positioning device 100 and the space positioning device 200, an IR emitter and an IR camera are employed. Thus, the first IR emitter and the second IR emitter may be the same IR emitter, and the first IR camera and the second IR camera may be the same IR camera; of course, the first IR emitter and the second IR emitter may be two different IR emitters, and the first IR camera and the second IR camera may be two different IR cameras, which would not be limited here.

Figure 6:
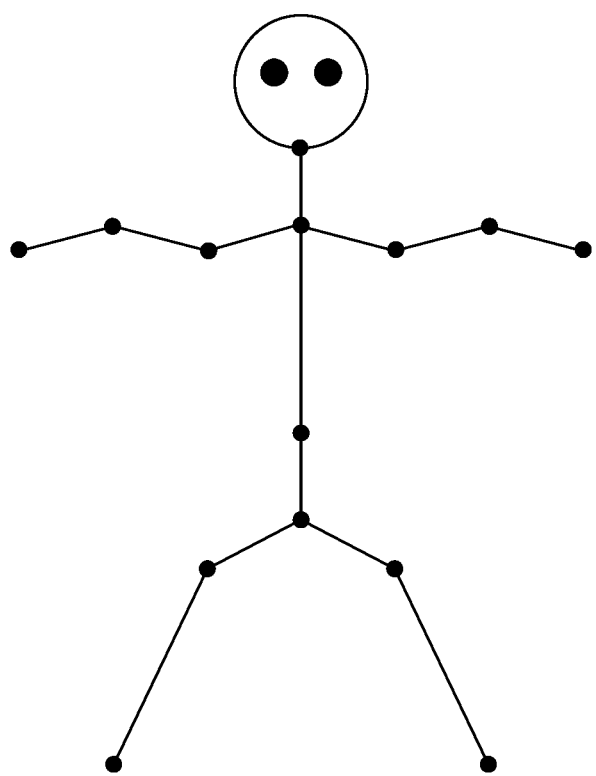
FIG. 6 is a schematic diagram showing a structure of the respective joint positions of the operator provided in the examples of the present disclosure.

For example, when the space is positioned preliminarily, the respective joint positions of the operator are positioned to obtain a body positioning coordinate of the operator. The positions of the human joints as described here include the positions of the two shoulders, the positions of the elbow joints, the positions of the wrists, the positions of the centers of the palms and the position of the neck, etc., which are not limited to joint positions on the upper part of the body, and may include respective joint positions of other parts. FIG. 6 only shows positions of parts of the joints, in which the black dots represent the joint positions. Since the respective joint positions have long distances therebetween, the detection precision of the joint positions is not high, which is generally of centimeter level. Thus, the IR imaging technology is generally employed for the detection and positioning thereof, and moreover, generally a double wide-angle camera is used to detect a large range. Of course, the preliminary positioning of the space is not limited to said IR imaging technology, and other technologies that can achieve said object can also be employed, which are not limited here.

Figure 7:
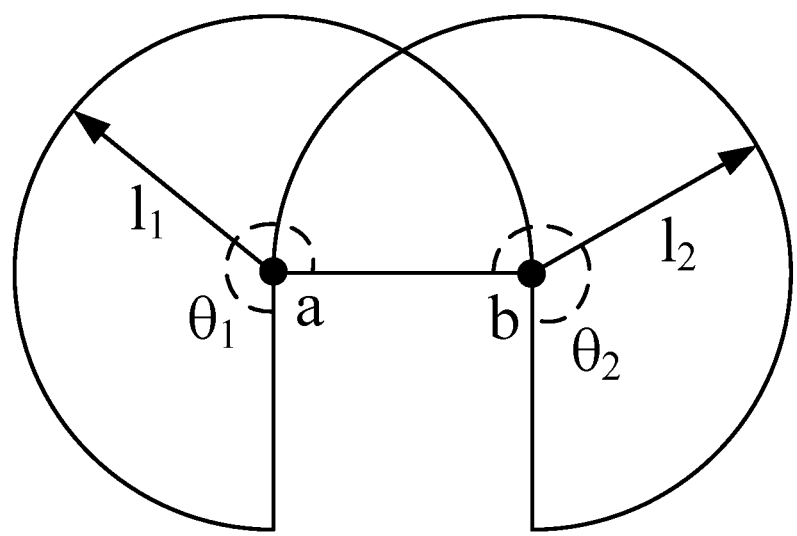
FIG. 7 is a schematic diagram showing a horizontal interface of the interaction space provided in the examples of the present disclosure.

For example, after the preliminary positioning of the space, the respective joint positions of the human body may be obtained. In addition, the interaction space processor 302 in said master control device 300 may determine the interaction space of the whole body of the operator according to the respective joint positions through the body of the operator. For example, if the interaction space of the upper part of the body is to be determined, the positions of the two shoulders, the positions of the elbows and the positions of the palms may be employed to determine the interaction space, i.e., the space within which the operator may make actions with his/her upper part of the body. In a horizontal interface of the interaction space as shown in FIG. 7, the interaction space of the left arm may be: a cone taking the left shoulder a as an axis center, the length of the left arm $l_1$ as a radius and having a vertex angle $\theta_1$ of 270°, and moreover, the left arm radius $l_1$=(the left shoulder coordinate−the left elbow coordinate)+(the left elbow coordinate−the left-hand coordinate). The interaction space of the right arm may be determined by a method similar to that for determining the interaction space of the left arm, i.e., a cone taking the right shoulder b as an axis center, the length of the right arm $l_2$ as a radius and having a vertex angle $\theta_2$ of 270°, and moreover, the right arm radius $l_2$=(the right shoulder coordinate−the right elbow coordinate)+(the right elbow coordinate−the right-hand coordinate). In addition, a union of the left arm interaction space and the right arm interaction space may be used as the interaction space of the upper part of the body.

Figure 8A:
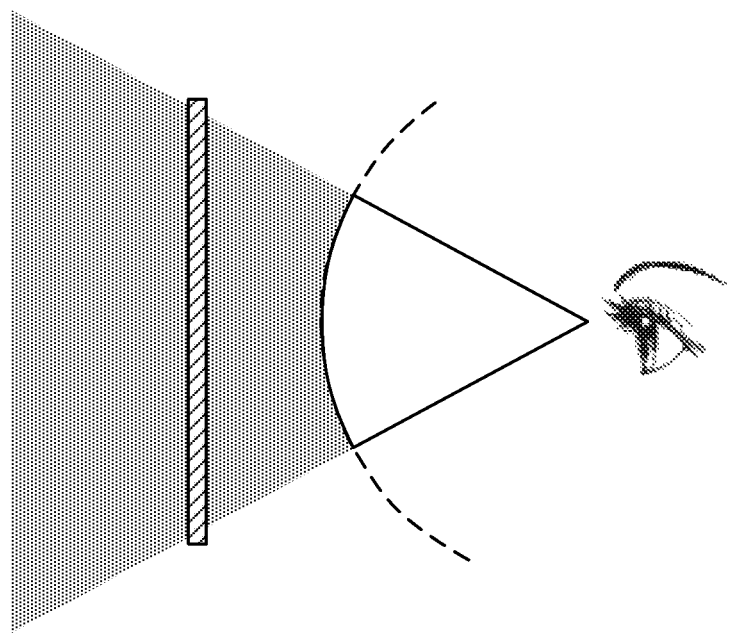
FIGS. 8a and 8b are schematic diagrams showing division of areas of the interaction space provided in the examples of the present disclosure.
Figure 8B:
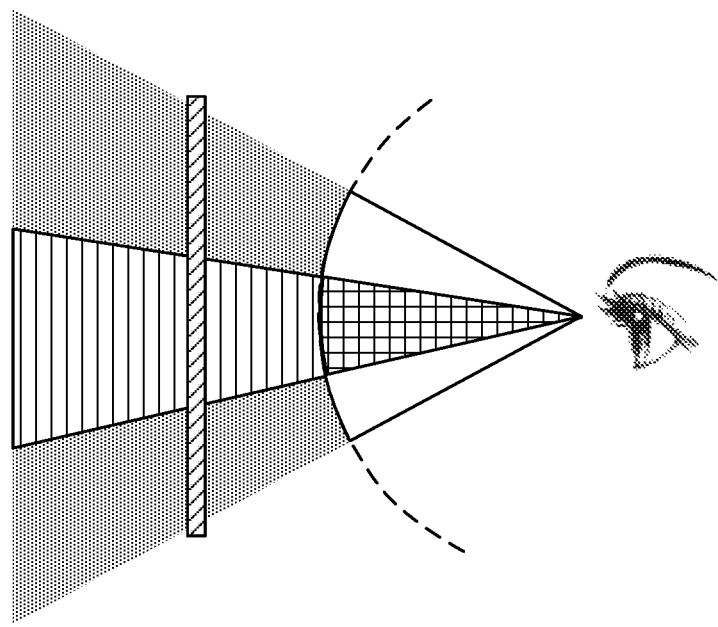

For example, as shown in FIG. 8a, the interaction space processor 302 in the master control device 300 is electrically connected to the visual field space processor 301, for determining, according to the position of the visual field space and the position of the interaction space, an area in the interaction space overlapping with the visual field space as absolute interaction space (the sectional area filled with white) and the other areas in the interaction space as relative interaction space (only partially shown in the figure); further, as shown in FIG. 8b, the interaction space processor 302 may determine, according to the position of the watching space (the area filled with vertical lines), an area in the absolute interaction space (the sectional area filled with white) overlapping with the watching space as refined interaction space (the area filled with square grids), such that within the refined interaction space, the operator may perform precise operations on the virtual object.

Figure 9:
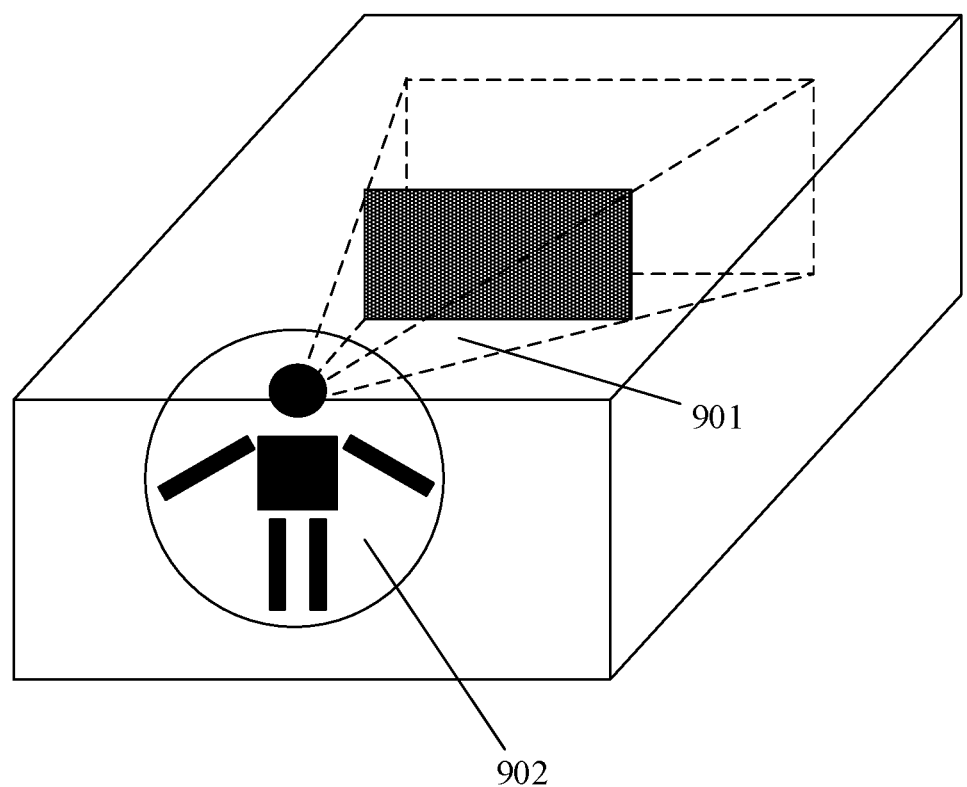
FIG. 9 is a schematic diagram showing a structure of the interaction space, the visual field space and the system space provided in the examples of the present disclosure.

For example, as shown in FIG. 9, according to the visual field space 901 and the interaction space 902 as determined, a system space consisting of the visual field space 901 and the interaction space 902 is determined to match the coordinates of the visual field space 901 and the interaction space 902; of course, the system space may be greater than or equal to a sum of the visual field space 901 and the interaction space 902; when the space of the three-dimensional somatosensory game being operated by the operator is large, the system space may be greater than a sum of the visual field space 901 and the interaction space 902 so as to improve game experience of the operator.

In practice, since a blind area of the IR imaging technology exists in an area near the camera, in order to precisely position the positions of finger joints and the positions of other joints where the touch control may take place, a detection device with a high precision may be employed to determine the joint positions of the touch control parts. Generally, a radar detector or an ultrasonic detector may be used for near-distance space positioning. Thus, in the interaction system provided by the examples of the present disclosure, the space positioning device may further include: a radar detector and/or an ultrasonic detector, wherein:

said radar detector is used for detecting, with radar, a radar signal reflected by the joint positions of a touch control part of the operator; and said ultrasonic detector is used for detecting, with ultrasonic waves, an ultrasonic signal reflected by the joint positions of a touch control part of the operator.

Figure 10A:
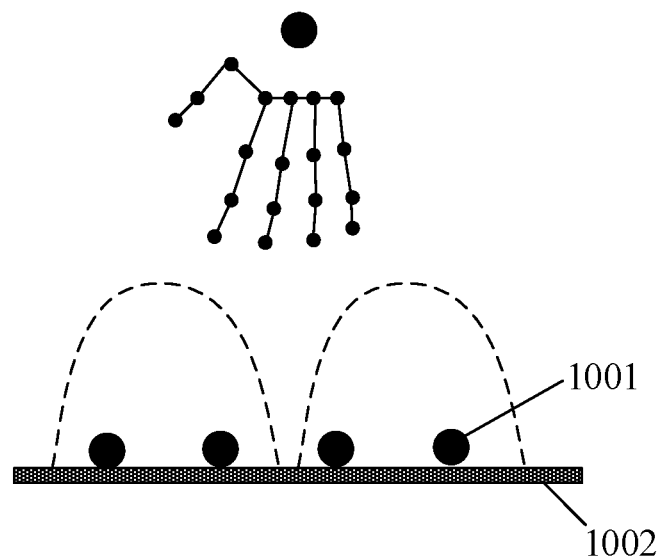
FIGS. 10a and 10b are schematic diagrams showing detection of a finger joint position provided in the examples of the present disclosure.

For example, when the joint positions of the touch control part are subjected to refined positioning, one of a radar detector and an ultrasonic detector (as shown in FIG. 2, the space positioning device 200 includes a radar detector 204), or a combination thereof may be employed to increase the precision of the detection. For example, when a finger joint position is subjected to refined positioning, a radar detection as shown in FIG. 10a comprises disposing a plurality of radar detectors 1001 evenly and dispersedly over a support plate 1002, and determining the position of the finger joint by detecting radar signals.

Figure 10B:
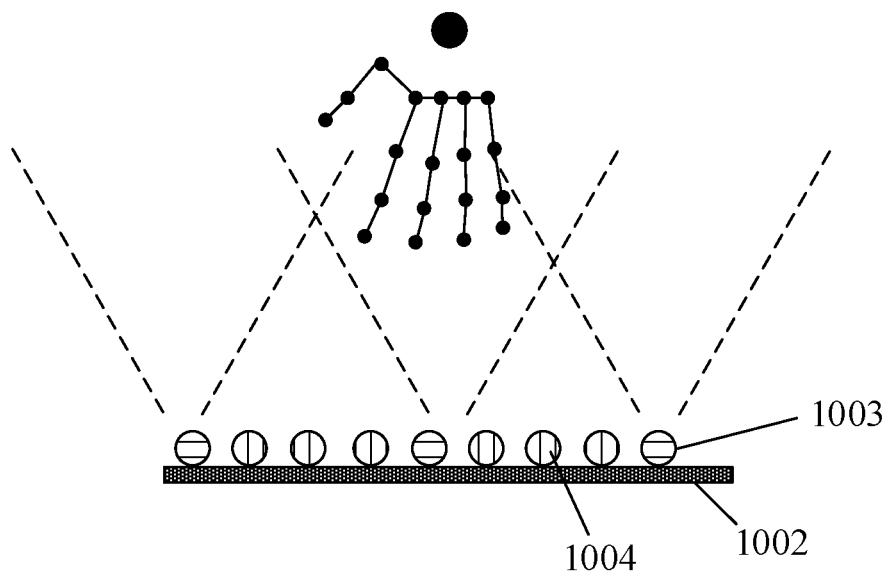

Of course, the refined positioning of the joint position of the touch control part is not limited to the use of a radar detector or an ultrasonic detector, and a combination of multiple cameras and multiple sets of light sources may also be employed. As shown in FIG. 10b, a plurality of light sources 1003 and a plurality of cameras 1004 are evenly and dispersedly disposed over a support plate 1002, with one light source 1003 interposed every three cameras 1004; the hand is illuminated by a plurality of sets of light sources 1003, and each camera 1004 can acquire a piece of image information, and then this image information is analyzed to obtain specific information on the finger joint positions. In this method, a plurality of cameras 1004 are provided to acquire image information from a plurality of angles, and when the space is positioned, the image input from the plurality of angles would greatly reduce the amount of calculation, which can both increase the precision of detection and accelerate the operation speed of the second processing chip, thereby reducing latency and improving the user experience.

For example, in order to enable refined positioning of a finger joint position without increasing power consumption, the IR imaging technology may be employed to determine a position of the wrist at the time of preliminary positioning, and then the position of the wrist is used as a base point to position the finger joint position precisely using a radar detector and/or an ultrasonic detector, such that it is unnecessary to re-find the position of the finger upon the refined positioning, facilitating reduction in power consumption.

In practice, during the somatosensory interaction, many touch control actions may take place, for example, a touch control action of the finger against a virtual door or a touch control action of the knee against a virtual ball; and non-touch control actions may also take place, such as opening a door with both arms. Thus, it is necessary to use changes of the respective joint positions of the operator to determine a current action of the operator. Thus, in the interaction system provided by the examples of the present disclosure, the operating action processor 303 may determine a current touch control action of the operator according to a change of the joint position of a touch control part of the operator, and may also determine a current body action of the operator according to a change of the joint position of a non-touch control part of the operator.

Figure 11A:
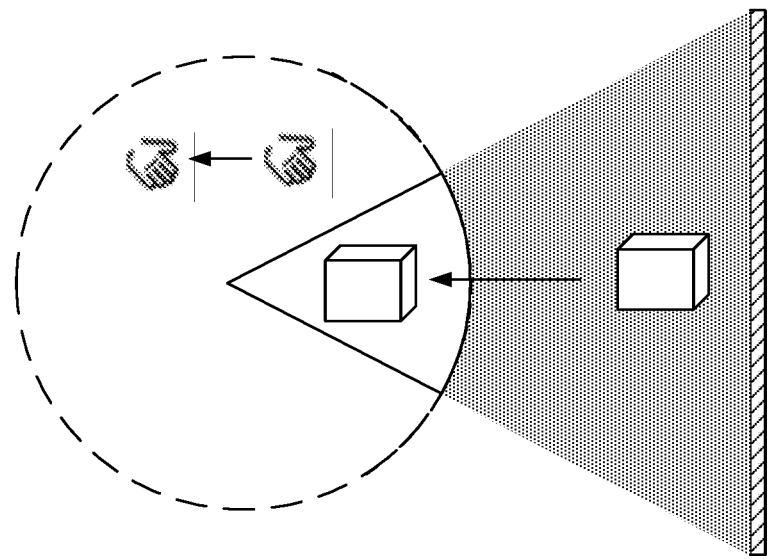
FIGS. 11a to 11c are schematic diagrams showing an operation that is performed by an operator on a selected virtual object and matches a current operation provided in the examples of the present disclosure.

In practice, in order to match a change of position of a virtual object in the visual field space with a current action of the operator, in the interaction system provided by the examples of the present disclosure, the interaction matching processor 304 is further used for determining that the operator performs an operation of moving the virtual object positioned in said visual field space outside the interaction space into said absolute interaction space when it is determined that the current touch control action of the operator is within the relative interaction space. As shown in FIG. 11a, the cube represents a virtual object, whose starting position is within the visual field space outside the absolute interaction space (the area filled with white). Since the position of the virtual object exceeds an operation range of the operator, the operator may pull the virtual object into the interaction space before performing operation thereon. Thus, when the operator makes a gesture of pulling, the virtual object can be moved correspondingly into the absolute interaction space.

For example, in order to pull a virtual object selected by the operator accurately into the absolute interaction space, the operation may be performed in combination with the watching space. Thus, in the interaction system provided by the examples of the present disclosure, the visual field space processor 301 may further determine the watching space within the visual field space according to an angle at which the eye of the operator is watching.

The interaction matching processor 304 may determine that the operator performs an operation of moving the virtual object positioned in said watching space outside the interaction space into said absolute interaction space when it is determined that the current touch control action of the operator is within the relative interaction space.

Figure 11B:
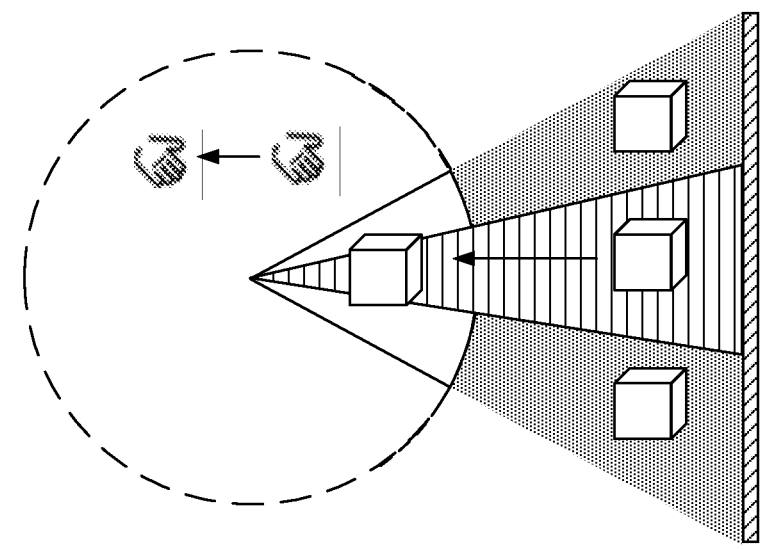

As shown in FIG. 11b, the cubes represent virtual objects, wherein the topmost virtual object is No. 1, the virtual object in the middle is No. 2, and the bottommost virtual object within the watching space (the area filled with vertical lines) is No. 3, No. 1 and No. 3 being positioned within the visual field space outside the watching space. Thus, when the operator watches at the No. 2 virtual object and makes an action of pulling, the No. 2 virtual object may be moved to the absolute interaction space.

For example, after the operator moves the virtual object into the absolute interaction space, operation on the virtual object may be performed. Thus, in the interaction system provided by the examples of the present disclosure, the interaction space processor 302 may also use an area in the absolute interaction space overlapping with the watching space as refined inaction space.

The interaction matching processor 304 may determine that the operator performs a corresponding operation on the selected virtual object positioned in said absolute interaction space when it is determined that the current touch control action of the operator is within the absolute interaction space.

Figure 11C:
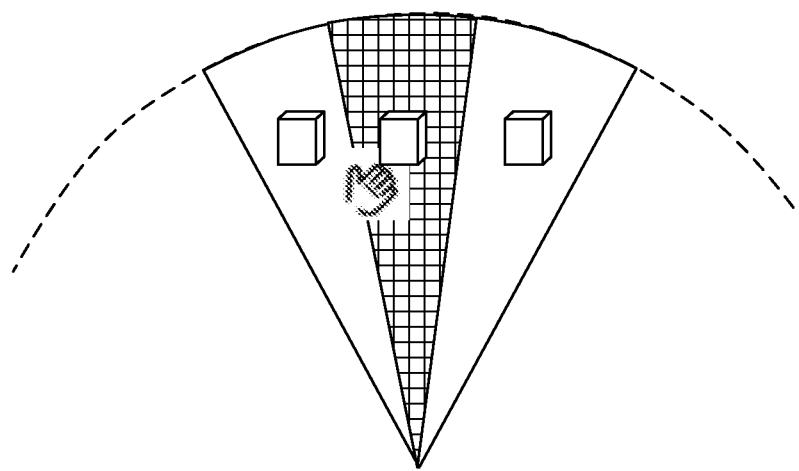

For example, when combined with the refined interaction space, the operator may perform precise operations on the virtual object, and the rate of erroneous operation is greatly decreased. Thus, in the interaction system provided by the examples of the present disclosure, the interaction matching processor 304 determines that the operator performs a corresponding operation only on the selected virtual object positioned in said refined interaction space when it is determined that the current touch control action of the operator is within the absolute interaction space. As shown in FIG. 11c, the cubes represent virtual objects, wherein the virtual objects are No. 1, No. 2 and No. 3 in a sequence from the left to the right. When the operator selects the No. 2 cube, the No. 2 cube may fall into the refined interaction space (the area filled with grids). Since the operator may position the picture within this range precisely, the operator can perform precise operations on the No. 2 cube, thereby reducing the rate of erroneous operations.

In practice, although the interaction matching processor 304 is used for matching the change of the position of the virtual object with a current action of the operator, an image processor 305 may be used for processing the image correspondingly. For example, a change in the position of the eye of the operator would result in a change of the visual field space, and correspondingly, the positioning of the virtual object in the system space would also change, which is contradictory to the observation habits of the operator. In order to solve this problem, the change of the visual field space may be monitored by monitoring the eye position of the operator, such that when the eye position of the operator changes, the position of the virtual object is maintained. Thus, in the interaction system provided by the examples of the present disclosure, the image processor 305 may determine a position of a three-dimensional image of said virtual object in said three-dimensional image display device according to a change of a visual angle at which the operator watches the same virtual object when the eye position of the operator changes, and generate a corresponding three-dimensional image display signal and output it to the electrically connected three-dimensional image display device, wherein a positional relationship between the same virtual object and said three-dimensional image display device is relatively fixed.

For example, in order to determine a position of the three-dimensional image of the virtual object in a three-dimensional image display device, in the interaction system provided by the examples of the present disclosure, the image processor 305 may determine the position of the three-dimensional image of said virtual object in said three-dimensional image display device according to the following formula:

$$c_1 = a_1 - (x_2 - x_1)\frac{\sqrt{(a_1 - a_2)^2 + (b_1 - b_2)^2}}{d_1}$$

$$d_1 = b_1 - (y_2 - y_1)\frac{\sqrt{(a_1 - a_2)^2 + (b_1 - b_2)^2}}{d_1}$$

$$c_2 = a_2 - (x_2 - x_1)\frac{\sqrt{(a_1 - a_2)^2 + (b_1 - b_2)^2}}{d_1}$$

$$d_2 = b_2 - (y_2 - y_1)\frac{\sqrt{(a_1 - a_2)^2 + (b_1 - b_2)^2}}{d_1}$$

wherein $(x_1, y_1)$ represents a position of a pupillary distance center of the eyes of the operator before a change, $(x_2, y_2)$ represents a position of the pupillary distance center of the eyes of the operator after the change, $(a_1, b_1)$ represents a left-eye image position of said virtual object in said three-dimensional image display device before the eye position of the operator changes, $(a_2, b_2)$ represents a right-eye image position of said virtual object in said three-dimensional image display device before the eye position of the operator changes, $(c_1, d_1)$ represents a left-eye image position of said virtual object in said three-dimensional image display device after the eye position of the operator changes, $(a_2, b_2)$ represents a right-eye image position of said virtual object in said three-dimensional image display device after the eye position of the operator changes, and d1 represents the pupillary distance of the eyes of the operator.

Figure 12:
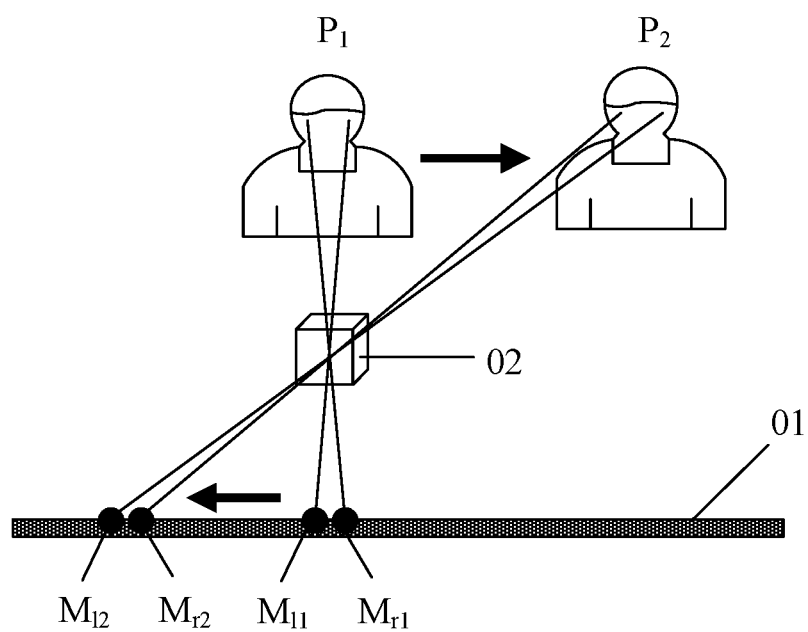
FIG. 12 is a schematic diagram showing changes of positions of a left-eye image and a right-eye image of the virtual object in a three-dimensional image display device when the eye position of the operator changes as provided in the examples of the present disclosure.

For example, as shown in FIG. 12, when the center of the pupillary distance of the eyes of operator is moved from $P_1$ $(x_1, y_1)$ to $P_2$ $(x_2, y_2)$, in order to maintain the relative positions of the virtual cube 02 and the three-dimensional display device 01, the left-eye image position and the right-eye image position of the virtual cube 02 on the three-dimensional image display device 01 may be moved from $M_{l1}$ $(a_1, b_1)$ and $M_{l2}$ $(a_2, b_2)$ to $M_{l2}$ $(C_1, d_1)$ and $M_{r2}$ $(c_2, d_2)$, respectively.

It shall be understood by those skilled in the art that the examples of the present disclosure may be implemented as a method, a system, or a computer program product. Therefore, examples of the present disclosure can take the form of an entirely hardware example, an entirely software example or an example containing both hardware and software elements. Moreover, the present disclosure can be in a form of one or more computer program products containing the computer-executable program codes which can be implemented in the computer-executable storage medium (including but not limited to disk memory, optical memory, etc.).

Based on the same concept, the examples of the present disclosure further provide a method for operating said interaction system of three-dimensional space. Since the principle for solving problems by said operating method is similar to that of the interaction system of three-dimensional space as mentioned above, please refer to the implementation of the system for the implementation of the operating method, which would not be repeated here.

Specifically, the method for operating the interaction system of three-dimensional space provided by the examples of the present disclosure may comprise the following steps:

determining, by an eye positioning device, an eye position of an operator and an angle at which the eye is watching and outputting them to a master control device;

determining, by a space positioning device, respective joint positions of the operator and outputting them to said master control device;

determining, by a visual field space processor in said master control device, visual field space according to the eye position of the operator and the angle at which the eye is watching;

determining, by an interaction space processor in said master control device, interaction space according to the respective joint positions of the operator and using an area in said interaction space overlapping with said visual field space as absolute interaction space and the other areas in said interaction space as relative interaction space;

determining, by an operating action processor in said master control device, a current action of the operator according to changes of the respective joint positions of the operator;

determining, by an interaction matching processor in said master control device, an operation that matches the current action and needs to be performed on a virtual object selected by the operator according to a relationship among the current action of the operator, the virtual object viewed by the operator and the absolute interaction space; and generating, by an image processor in said master control device, a corresponding three-dimensional image display signal according to the visual field space and the operation that matches the current action and needs to be performed on the virtual object selected by the operator and outputting it to an electrically connected three-dimensional image display device.

The present disclosure is described with reference to the flow charts and/or block diagrams of the method, apparatus (system) and computer program product according to the examples of the present disclosure. It shall be understood that each flow and/or block in the flow charts and/or block diagrams and a combination thereof may be implemented by computer program instructions. These computer program instructions may be provided to the processor of a general-purpose computer, a dedicated computer, an embedded processing device or any other programmable data processing device to produce a machine causing the instructions executed by the processor of the computer or the other programmable data processing device to produce means for implementing the functions designated in the one or more flows in the flow charts and/or one or more blocks in the block diagrams.

These computer program instructions may be stored in a computer readable memory that can direct a computer or any other programmable data processing device to operate in a specific manner, such that the instructions stored in the computer readable memory produce a manufactured article including instruction means that implements the functions designated in one or more flows in the flow charts and/or one or more blocks in the block diagrams.

These computer program instructions may also be loaded on a computer or any other programmable data processing device causing the computer or the other programmable data processing device to perform a series of operation steps to produce a computer-implemented process, such that the instructions executed on the computer or the other programmable device provide steps for implementing the functions designated in the one or more flows in the flow charts and/or one or more blocks in the block diagrams.

Although preferred examples of the present disclosure have already been described, once those skilled in the art understand basic creative concept, they can make additional modifications and alterations to these examples. Therefore, the attached claims are intended to comprise preferred embodiments and all modifications and changes covered by the scope of the present disclosure.

The examples of the present disclosure provide an interaction system of three-dimensional space and a method for operating the same, wherein the interaction system: determines visual field space according to an eye position of an operator and an angle at which the eye is watching, and determines absolute interaction space and relative interaction space according to respective joint positions of the operator and the visual field space, thereby achieving dividing of areas of the space; determines an operation that matches a current action and needs to be performed by the operator on a selected virtual object according to a relationship among the current action of the operator, the virtual object viewed by the operator and the absolute interaction space, such that when the operator makes the corresponding action, the operation matching the action of the operator is performed on the virtual object; outputs the generated corresponding three-dimensional image display signal to an electrically connected three-dimensional image display device to display the three-dimensional image and complete somatosensory interaction of the three-dimensional space. Thus, the interaction system not only divides the areas of the space but also analyzes the actions made by the operator, such that the operation of the operator interacts with the image and an excellent experience of somatosensory interaction is achieved.

It will be apparent to those skilled in the art that various modifications and variations can be made to the examples of the present disclosure without departing from the spirits and scope of the present disclosure. In this case, if the modifications and variations made to the present disclosure fall within the scope of the claims of the present disclosure and equivalents thereof, the present disclosure is intended to include these modifications and variations.

The invention claimed is:

1. An interaction system of three-dimensional space, comprising: an eye positioning device, a space positioning device, and a master control device, wherein:
   said eye positioning device is used for determining an eye position of an operator and an angle at which the eye is watching and for outputting the eye position and the angle to said master control device;
   said space positioning device is used for determining respective joint positions of a whole body of the operator and for outputting the respective joint positions to said master control device;
   said master control device includes: a visual field space processor, an interaction space processor, an operating action processor, an interaction matching processor and an image processor;
   said visual field space processor being electrically connected to said eye positioning device, for determining visual field space according to the eye position of the operator and the angle at which the eye is watching;
   said interaction space processor being electrically connected to said space positioning device and said visual field space processor, respectively, for determining interaction space of the whole body of the operator according to the respective joint positions of the whole body of the operator and using an area in said interaction space overlapping with said visual field space as absolute interaction space and the other areas in said interaction space as relative interaction space;
   said operating action processor being electrically connected to said space positioning device, for determining a current action of the operator according to changes of the respective joint positions of the operator;
   said interaction matching processor being electrically connected to said visual field space processor, said interaction space processor and said operating action processor, respectively, for determining an operation that matches the current action and needs to be performed on a selected virtual object by the operator according to a relationship among the current action of the operator, the virtual object viewed by the operator and the absolute interaction space;
   said image processor being electrically connected to said interaction matching processor and said visual field space processor, respectively, for generating a corresponding three-dimensional image display signal according to the visual field space and the operation that matches the current action and needs to be performed on the selected virtual object by the operator and outputting the corresponding three-dimensional image display signal to an electrically connected three-dimensional image display device,
   wherein said interaction matching processor is further used for determining that the operator performs an operation of moving the virtual object positioned in said visual field space outside the interaction space into said absolute interaction space when it is determined that the virtual object is positioned in said visual field space outside the interaction space such that a position of the virtual object exceeds an operation range of the operator and when it is determined that a current touch control action of the operator is within the relative interaction space.

2. The interaction system according to claim 1, wherein said operating action processor is further used for determining the current touch control action of the operator according to a change of a joint position of a touch control part of the operator; and determining a current body action of the operator according to a change of a joint position of a non-touch control part of the operator.

3. The interaction system according to claim 1, wherein said visual field space processor is further used for determining watching space within said visual field space according to the angle at which the eye of the operator is watching;
said interaction matching processor is further used for determining that the operator performs an operation of moving the virtual object positioned in said watching space outside the interaction space into said absolute interaction space when it is determined that the current touch control action of the operator is within the relative interaction space.

4. The interaction system according to claim 3, wherein said interaction space processor is further used for using an area in the absolute interaction space overlapping with the watching space as refined interaction space;
said interaction matching processor is further used for determining that the operator performs a corresponding operation on the selected virtual object positioned in said absolute interaction space when it is determined that the current touch control action of the operator is within the absolute interaction space.

5. The interaction system according to claim 4, wherein said interaction matching processor is further used for determining that the operator performs a corresponding operation on the selected virtual object positioned in said refined interaction space when it is determined that the current touch control action of the operator is within the absolute interaction space.

6. The interaction system according to claim 2, wherein said image processor is further used for determining a position of a three-dimensional image of said virtual object in said three-dimensional image display device according to a change of a visual angle at which the operator watches the same virtual object when the eye position of the operator changes, and for generating a corresponding three-dimensional image display signal and outputting it to the electrically connected three-dimensional image display device, wherein a positional relationship between the same virtual object and said three-dimensional image display device is relatively fixed.

7. The interaction system according to claim 6, wherein said image processor is further used for determining the position of the three-dimensional image of said virtual object in said three-dimensional image display device according to the following formula:

$$c_1 = a_1 - (x_2 - x_1)\frac{\sqrt{(a_1 - a_2)^2 + (b_1 - b_2)^2}}{d_{eye}}$$

-continued $$d_1 = b_1 - (y_2 - y_1)\frac{\sqrt{(a_1 - a_2)^2 + (b_1 - b_2)^2}}{d_{eye}}$$

$$c_2 = a_2 - (x_2 - x_1)\frac{\sqrt{(a_1 - a_2)^2 + (b_1 - b_2)^2}}{d_{eye}}$$

$$d_2 = b_2 - (y_2 - y_1)\frac{\sqrt{(a_1 - a_2)^2 + (b_1 - b_2)^2}}{d_{eye}}$$

wherein $(x_1, y_1)$ represents a position of a pupillary distance center of the eyes of the operator before a change, $(x_2, y_2)$ represents a position of the pupillary distance center of the eyes of the operator after the change, $(a_1, b_1)$ represents a left-eye image position of said virtual object in said three-dimensional image display device before the eye position of the operator changes, $(a_2, b_2)$ represents a right-eye image position of said virtual object in said three-dimensional image display device before the eye position of the operator changes, $(c_1, d_1)$ represents a left-eye image position of said virtual object in said three-dimensional image display device after the eye position of the operator changes, $(c_2, d_2)$ represents a right-eye image position of said virtual object in said three-dimensional image display device after the eye position of the operator changes, and $d_{eye}$ represents the pupillary distance of the eyes of the operator.

8. The interaction system according to claim 1, wherein said eye positioning device includes: a first IR emitter, a first IR camera, and a first processing chip, wherein:
said first IR emitter is used for emitting a first IR signal to the operator;
said first IR camera is used for acquiring a first IR signal image reflected by the eyes of the operator;
said first processing chip is used for determining the eye position of the operator and the angle at which the eye is watching according to the first IR signal emitted by the first IR emitter and the first IR signal image reflected by the eyes of the operator and acquired by the first IR camera, and for outputting them to said master control device.

9. The interaction system according to claim 8, wherein said space positioning device includes: a second IR emitter, a second IR camera, and a second processing chip, wherein:
said second IR emitter is used for emitting a second IR signal to the operator;
said second IR camera is used for acquiring a second IR signal image reflected by the respective joint positions of the operator;
said second processing chip is used for determining the respective joint positions of the operator according to the second IR signal emitted by the second IR emitter and the second IR signal image reflected by the respective joint positions of the operator and acquired by the second IR camera, and for outputting them to said master control device.

10. The interaction system according to claim 9, wherein said first IR emitter and said second IR emitter are the same IR emitter; and said first IR camera and said second IR camera are the same IR camera.

11. The interaction system according to claim 10, wherein said space positioning device further includes: a radar detector and/or an ultrasonic detector, wherein:

said radar detector is used for detecting, with radar, a radar signal reflected by the joint positions of a touch control part of the operator; and said ultrasonic detector is used for detecting, with ultrasonic waves, an ultrasonic signal reflected by the joint positions of the touch control part of the operator.

12. A method for operating an interaction system of three-dimensional space, comprising:

determining, by an eye positioning device, an eye position of an operator and an angle at which the eye is watching and outputting the eye position and the angle to a master control device;

determining, by a space positioning device, respective joint positions of the operator and outputting the respective joint positions to said master control device;

determining, by a visual field space processor in said master control device, visual field space according to the eye position of the operator and the angle at which the eye is watching;

determining, by an interaction space processor in said master control device, interaction space of a whole body of the operator according to the respective joint positions of the whole body of the operator and using an area in said interaction space overlapping with said visual field space as absolute interaction space and the other areas in said interaction space as relative interaction space;

determining, by an operating action processor in said master control device, a current action of the operator according to changes of the respective joint positions of the operator;

determining, by an interaction matching processor in said master control device, an operation that matches the current action and needs to be performed on a virtual object selected by the operator according to a relationship among the current action of the operator, the virtual object viewed by the operator and the absolute interaction space; and generating, by an image processor in said master control device; a corresponding three-dimensional image display signal according to the visual field space and the operation that matches the current action and needs to be performed on the virtual object selected by the operator and outputting it to an electrically connected three-dimensional image display device, wherein it is further determined, by said interaction matching processor, that the operator performs an operation of moving the virtual object positioned in said visual field space outside the interaction space into said absolute interaction space when it is determined that the virtual object is positioned in said visual field space outside the interaction space such that a position of the virtual object exceeds an operation range of the operator and when it is determined that a current touch control action of the operator is within the relative interaction space.

13. An interaction control device of three-dimensional space; comprising: a visual field space processor, an interaction space processor, an operating action processor, an interaction matching processor and an image processor;

said visual field space processor being electrically connected to an eye positioning device, for determining visual field space according to an eye position of an operator and an angle at which the eye is watching, which are received from said eye positioning device;

said interaction space processor being electrically connected to a space positioning device and said visual field space processor, respectively, for determining interaction space of a whole body of the operator according to the respective joint positions of the whole body of the operator which are received from said space positioning device and using an area in said interaction space overlapping with said visual field space as absolute interaction space and the other areas in said interaction space as relative interaction space;

said operating action processor being electrically connected to said space positioning device, for determining a current action of the operator according to changes of the respective joint positions of the operator;

said interaction matching processor being electrically connected to said visual field space processor, said interaction space processor and said operating action processor, respectively, for determining an operation that matches the current action and needs to be performed on a selected virtual object by the operator according to a relationship among the current action of the operator, the virtual object viewed by the operator and the absolute interaction space;

said image processor being electrically connected to said interaction matching processor and said visual field space processor, respectively, for generating a corresponding three-dimensional image display signal according to the visual field space and the operation that matches the current action and needs to be performed on the selected virtual object by the operator and outputting the corresponding three-dimensional image display signal to an electrically connected three-dimensional image display device, wherein said interaction matching processor is further used for determining that the operator performs an operation of moving the virtual object positioned in said visual field space outside the interaction space into said absolute interaction space when it is determined that the virtual object is positioned in said visual field space outside the interaction space such that a position of the virtual object exceeds an operation range of the operator and when it is determined that a current touch control action of the operator is within the relative interaction space.

14. The interaction control device according to claim 13, wherein said operating action processor is further used for determining the current touch control action of the operator according to a change of a joint position of a touch control part of the operator; and determining a current body action of the operator according to a change of a joint position of a non-touch control part of the operator.

15. The interaction control device according to claim 14, wherein said image processor is further used for determining a position of a three-dimensional image of said virtual object in said three-dimensional image display device according to a change of a visual angle at which the operator watches the same virtual object when the eye position of the operator changes, and for generating a corresponding three-dimensional image display signal and outputting it to the electrically connected three-dimensional image display device, wherein a positional relationship between the same virtual object and said three-dimensional image display device is relatively fixed.

16. The interaction control device according to claim 13, wherein said visual field space processor is further used for determining watching space within said visual field space according to the angle at which the eye of the operator is watching;

said interaction matching processor is further used for determining that the operator performs an operation of moving the virtual object positioned in said watching space outside the interaction space into said absolute interaction space when it is determined that the current touch control action of the operator is within the relative interaction space.

17. The interaction control device according to claim 16, wherein said interaction space processor is further used for using an area in the absolute interaction space overlapping with the watching space as refined interaction space;

said interaction matching processor is further used for determining that the operator performs a corresponding operation on the selected virtual object positioned in said absolute interaction space when it is determined that the current touch control action of the operator is within the absolute interaction space.

18. The interaction control device according to claim 17, wherein said interaction matching processor is further used for determining that the operator performs a corresponding operation on the selected virtual object positioned in said refined interaction space when it is determined that the current touch control action of the operator is within the absolute interaction space.

\* \* \* \* \*